United States Patent
Wong et al.

(10) Patent No.: US 11,109,701 B1
(45) Date of Patent: Sep. 7, 2021

(54) EDGED TOOL STORAGE DEVICE

(71) Applicant: KAI R&D CENTER CO., LTD., Gifu (JP)

(72) Inventors: Hung Tai Wong, Gifu (JP); Cheuk Wa Pun, Gifu (JP)

(73) Assignee: KAI R&D CENTER CO., LTD., Gifu (JP)

( * ) Notice: Subject to any disclaimer, the term of this patent is extended or adjusted under 35 U.S.C. 154(b) by 0 days.

(21) Appl. No.: 16/971,270

(22) PCT Filed: Jan. 29, 2020

(86) PCT No.: PCT/JP2020/003208
§ 371 (c)(1),
(2) Date: Aug. 19, 2020

(51) Int. Cl.
*A47G 21/14* (2006.01)
*B26B 29/02* (2006.01)
*A47J 47/16* (2006.01)

(52) U.S. Cl.
CPC .............. *A47G 21/14* (2013.01); *A47J 47/16* (2013.01); *B26B 29/02* (2013.01)

(58) Field of Classification Search
None
See application file for complete search history.

(56) References Cited

U.S. PATENT DOCUMENTS

| | | | |
|---|---|---|---|
| 228,998 A * | 6/1880 | Johnston | |
| 926,852 A * | 7/1909 | Catlin | |
| 1,346,909 A * | 7/1920 | Onufryk | A47G 21/14 312/97.1 |
| 1,491,623 A * | 4/1924 | Pitchur | A47G 21/14 30/295 |
| 4,561,548 A * | 12/1985 | Call | A47G 21/14 211/70.7 |
| 5,000,548 A | 3/1991 | Mercado | |
| 5,211,322 A * | 5/1993 | Nealy | B26B 29/025 224/230 |
| 2003/0226263 A1* | 12/2003 | Fedor | B26B 3/00 30/298.4 |
| 2005/0000848 A1 | 1/2005 | Turner et al. | |
| 2012/0267330 A1* | 10/2012 | Borodulin | A47J 47/16 211/85.8 |
| 2015/0107117 A1* | 4/2015 | Bell | A47G 21/14 30/143 |

FOREIGN PATENT DOCUMENTS

| | | |
|---|---|---|
| JP | S61-100348 U | 6/1986 |
| JP | 1989-120430 U | 8/1989 |

(Continued)

*Primary Examiner* — Hwei-Siu C Payer
(74) *Attorney, Agent, or Firm* — White & Case LLP (57) ABSTRACT

An edged tool storage device storing a kitchen knife and the like has a structure including a pedestal, a support rod that extends in a substantially vertical direction from the pedestal, and a first edged tool cover and a second edged tool cover that are removably connected to the support rod and store edged tools, in which each of the first edged tool cover and the second edged tool cover includes a holding part that is elastically fitted onto the support rod and thus holds the support rod, and is removably connected to the support rod by the holding part, and the holding part of the first edged tool cover and the holding part of the second edged tool cover are different in height when connected to the support rod.

5 Claims, 7 Drawing Sheets

(56) References Cited

FOREIGN PATENT DOCUMENTS

| | | |
|---|---:|---|
| JP | 3087683 U | 8/2002 |
| JP | 2006-070952 A | 3/2006 |
| JP | 2006-070952 A | 3/2006 |
| JP | 3199142 U | 8/2015 |
| JP | 2019-077030 A | 5/2019 |
| JP | 2019-077030 A | 5/2019 |
| JP | 6569928 B1 | 9/2019 |
| KR | 10-20170064752 A | 6/2017 |
| WO | WO 01/87127 A1 * | 11/2001 |

* cited by examiner

EDGED TOOL STORAGE DEVICE

CROSS-REFERENCE TO RELATED APPLICATION

This application is a national stage filing under 35 U.S.C. § 371 of International Application No. PCT/JP2020/003208, filed on Jan. 29, 2020. The specification of the foregoing application is incorporated herein by reference in its entirety.

TECHNICAL FIELD

One aspect of the present invention relates to an edged tool storage device storing an edged tool.

BACKGROUND ART

Conventionally, a kitchen knife holder storing a kitchen knife often has a structure in which the kitchen knife is inserted in an erected state to be held. Moreover, some have a structure in which a kitchen knife is held in a state where the blade side of the kitchen knife is laid downward. Such a kitchen knife holder is disclosed in Patent Documents 1 to 5, and the like.

CITATION LIST

Patent Documents

Patent Document 1: Japanese Patent No. 6569928
Patent Document 2: Japanese Patent Application Laid-open No. 2019-77030
Patent Document 3: Japanese Registered Utility Model No. 3087683
Patent Document 4: Japanese Registered Utility Model No. 3199142
Patent Document 5: Japanese Examined Utility Model Application Publication No. S61-100348

SUMMARY

Technical Problem

A kitchen knife holder is often placed in a kitchen of a home or a restaurant. The conventional kitchen knife holder simply has a function of storing a kitchen knife, and few kitchen knife holders have focused on their outer appearance, with there being no real concept of kitchen knife holders as interior accessories placed in a kitchen. However, cooking tools including a kitchen knife placed in a kitchen are not only simple cooking tools but also interior accessories coloring the kitchen. Thus, such cooking tools with excellent appearances convert the kitchen into a joyful space. In addition, the functionality and sense of playfulness makes the kitchen a more joyful space. The invention aims at providing an edged tool storage device having an excellent appearance and a function along with a sense of playfulness as an interior accessory making the kitchen a more joyful space.

Solution to Problem

In order to solve the above-described problems, the invention provides an edged tool storage device with the following structure. In the following description, reference signs and the like in the drawings may be shown in parentheses for easy understanding of the invention. However, the components of the invention are not limited to these concrete structures, and should be interpreted widely within the range technically understood by a person skilled in the art.

One aspect of the invention is an edged tool storage device, including a pedestal (1), a support rod (2) that extends in a substantially vertical direction from the pedestal, and a first edged tool cover and a second edged tool cover (any two of 3, 3A, 3B, and 3C) that are removably connected to the support rod and store edged tools, in which each the first edged tool cover and the second edged tool cover includes a holding part (32) that is elastically fitted onto the support rod and is held by the support rod, and is removably connected to the support rod by the holding part, and the holding part of the first edged tool cover and the holding part of the second edged tool cover are different in height when connected to the support rod.

In the edged tool storage device storing a kitchen knife, kitchen scissors, and the like with the above-described structure, with the structure including the edged tool cover attached to and removed from the support rod, it is possible to achieve a structure having an appearance and a function that are not provided by the conventional edged tool holder. In this manner, it is possible to convert the edged tool storage device from a mere kitchen knife holder having a function of storing a kitchen knife into an interior accessory with a sense of playfulness, capable of storing edged tools. Moreover, with the holding part, it is possible to easily attach and remove the edged tool cover relative to the support rod and easily change a connection position of the edged tool cover to the support rod. Furthermore, in a case where the first edged tool cover and the second edged tool cover are connected to the support rod, the heights of the holding parts are different. Thus, it is possible to connect these edged tool covers to the support rod without interfering with each other.

In the above-described edged tool storage device, it is preferable that the support rod is columnar, and the edged tool cover is connected to an arbitrary position in a circumferential direction of the support rod.

In the edged tool storage device with the above-described structure, it is possible to rotate a position of the edged tool cover relative to the support rod, which further improves the appearance. In addition, it is possible to change a position of the edged tool in accordance with a use state of the edged tool, which is excellent also in practicability.

In the above-described edged tool storage device, it is preferable that the holding part (32) includes surface contact parts (32b and 32d) that are in surface contact with a placement surface when the edged tool cover is placed so that the holding part is a fulcrum.

In the edged tool storage device with the above-described structure, the edged tool cover removed from the support rod may be placed in an erected state in the state where the blade side or the back side is downward.

In the above-described edged tool storage device, it is preferable that the edged tool cover includes a cover pressing part (33) that projects outward on a substantially opposite side from the holding part.

In the edged tool storage device with the above-described structure, it is possible to achieve a structure in which the edged tool stored in the edged tool cover is taken out easily.

DESCRIPTION OF EMBODIMENTS

The edged tool storage device according to one aspect of the invention is characterized in a structure including an edged tool cover removably connected to an arbitrary position in a circumferential direction of a support rod.

The edged tool storage device of the invention will be specifically described with reference to the drawings. However, the embodiment described in the following is only an example of the invention, and does not intend the technical range of the invention to be interpreted restrictively. Note that in the drawings, the same components are represented with the same reference signs, and the description thereof may be omitted.

1. Embodiment

<Structure of Edged Tool Storage Device>

Figure 1:
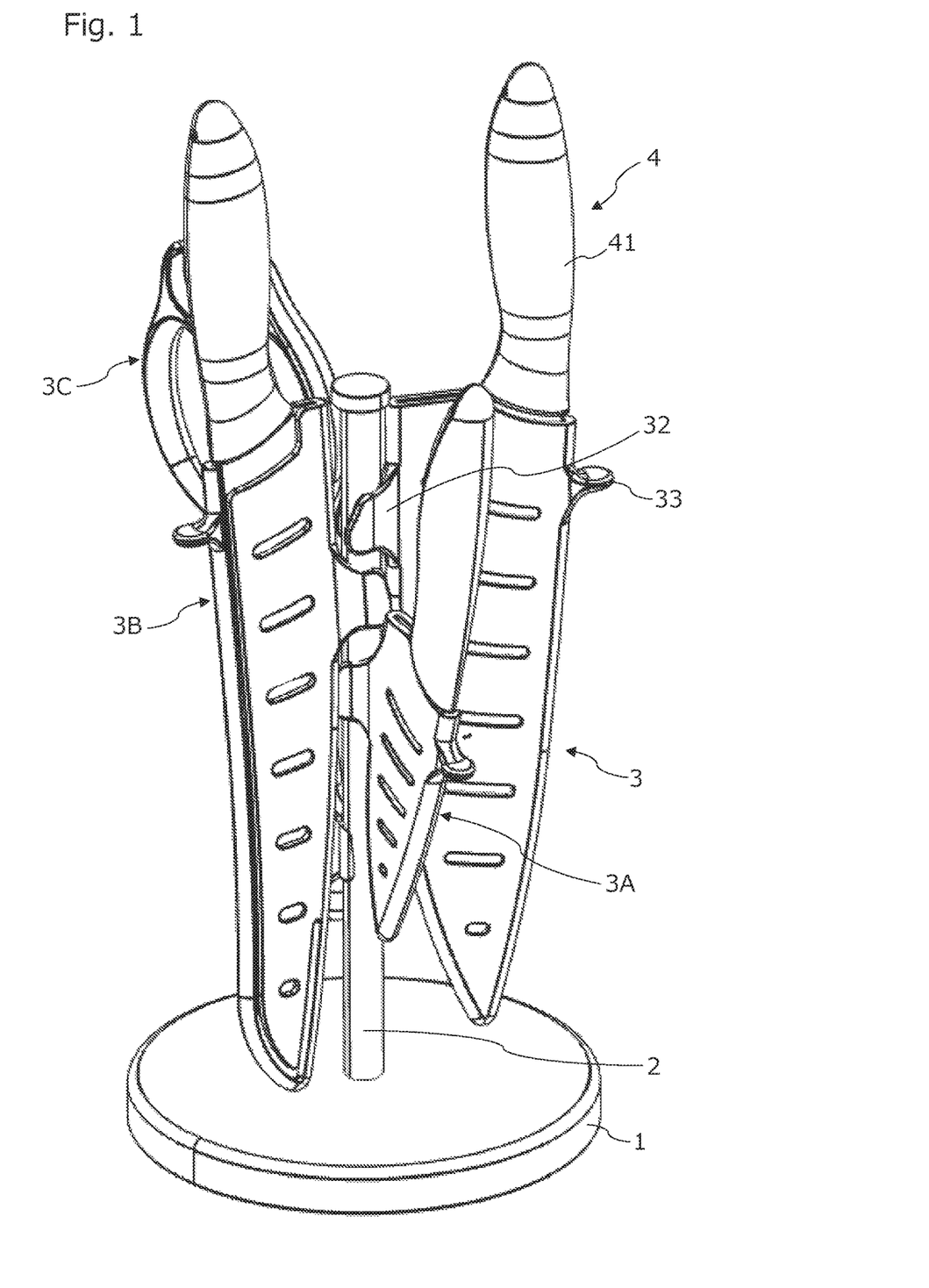
FIG. 1 is a perspective view of an edged tool storage device.
Figure 2:
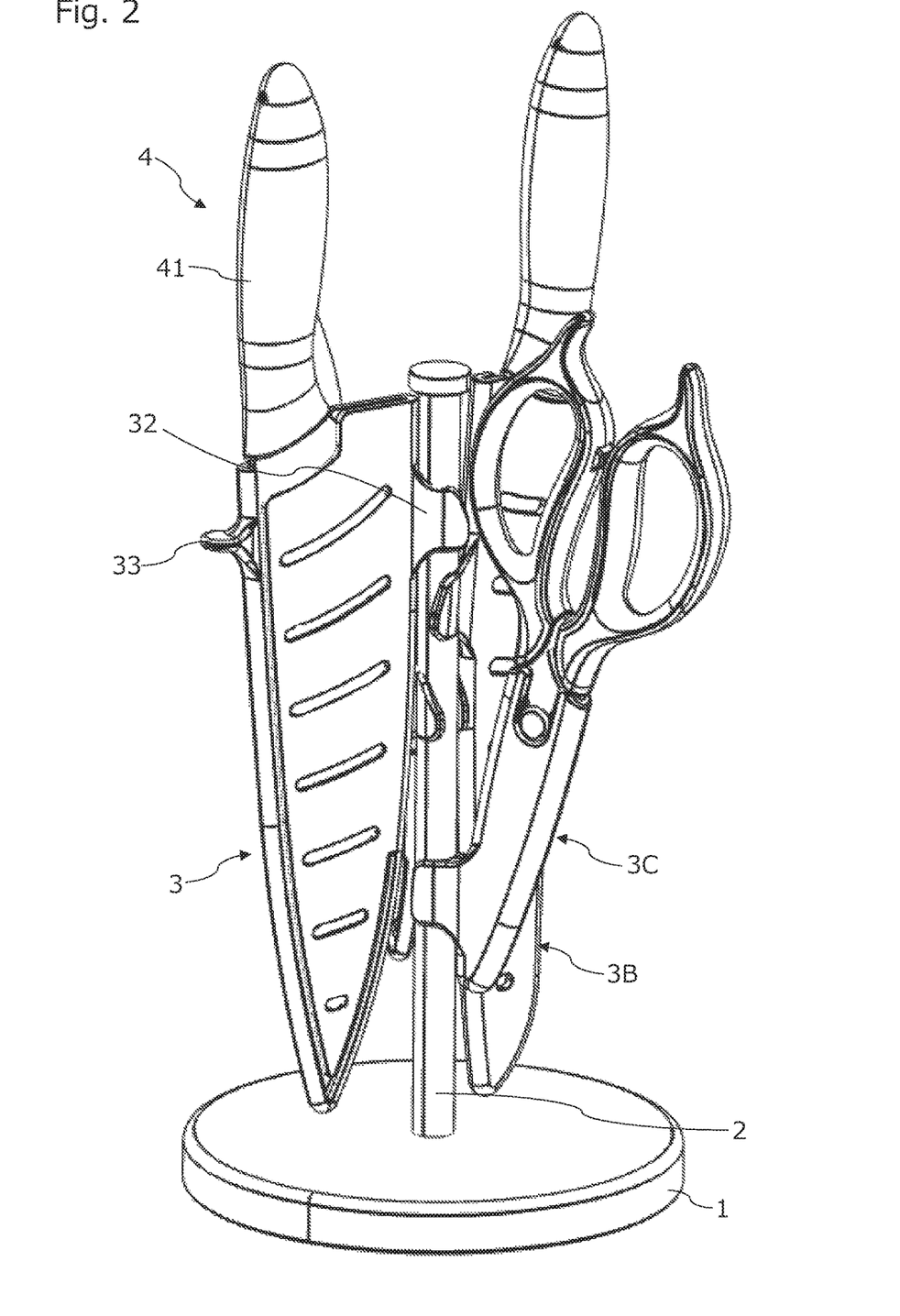
FIG. 2 is a perspective view of the edged tool storage device, viewed from a different angle from FIG. 1.
Figure 3:
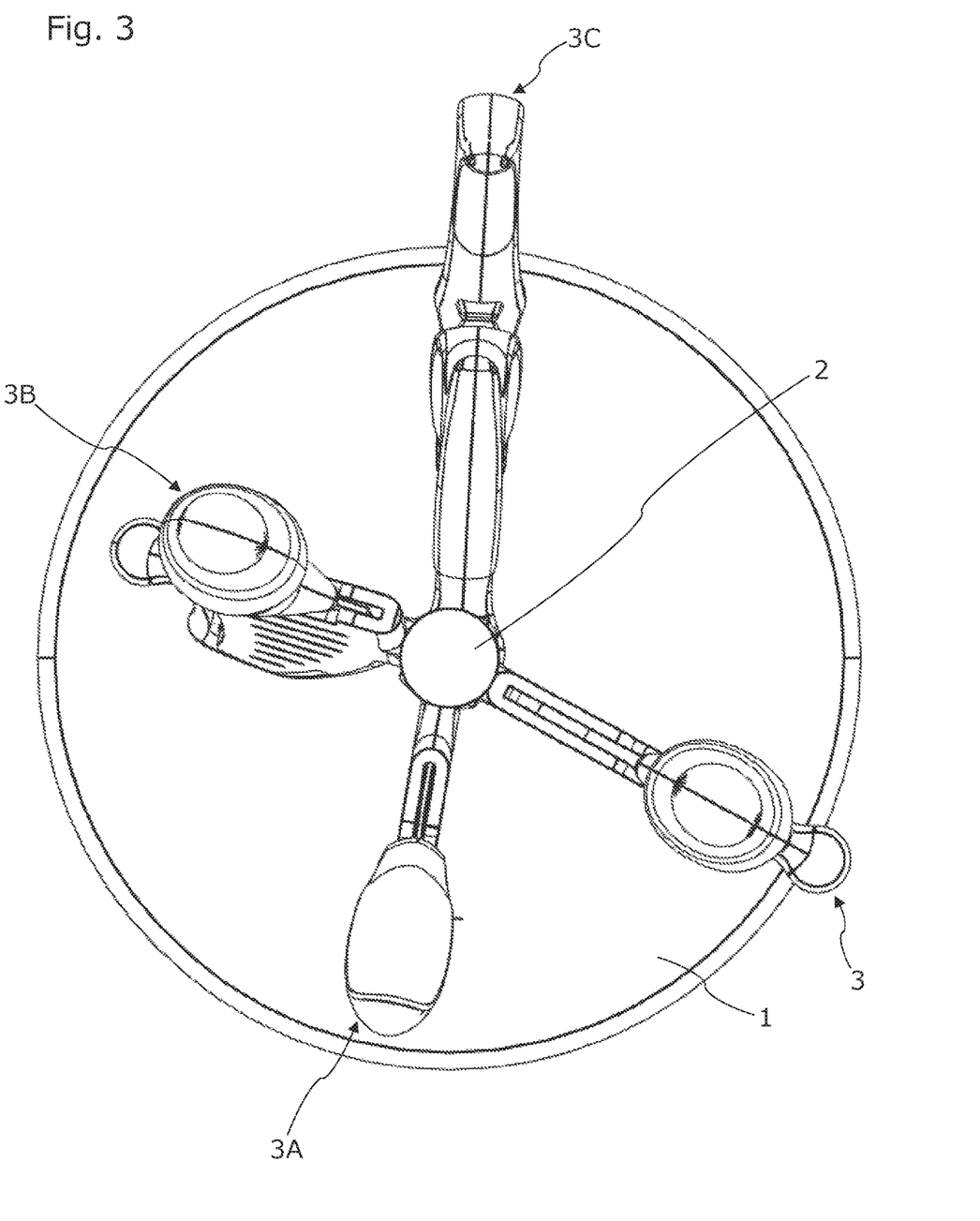
FIG. 3 is a plane view of the edged tool storage device, viewed from the upper side.

FIG. 1 and FIG. 2 are outer perspective views of the edged tool storage device of the embodiment, and are diagrams viewed from mutually different directions. FIG. 3 is a plane view of the edged tool storage device of the embodiment, viewed from the upper side. As illustrated in these drawings, the edged tool storage device of the embodiment includes a pedestal 1, a support rod 2, and four edged tool covers 3, 3A, 3B and 3C.

<Pedestal 1>

The pedestal 1 is a circular base with a center corresponding to a position of the support rod 2. The pedestal 1 has a sufficient weight and diameter so as to be stable even in a case where a plurality of edged tool covers 3 to 3C are connected to the support rod 2. When viewed from the upper surface, the pedestal 1 has a diameter larger than the half of a distance between the center of the support rod 2 and an outermost end of the edged tool covers 3 to 3C.

<Support Rod 2>

The support rod 2 is a columnar member extending in a substantially vertical direction from the substantially center portion of the pedestal 1. Holding parts 32 of the edged tool covers 3 to 3C are elastically fitted onto the support rod 2, whereby the support rod 2 supports the edged tool covers 3 to 3C. The support rod 2 is made of metal or resin.

<Edged Tool Covers 3 to 3C>

The edged tool covers 3 to 3C have the similar structure, and thus the description of the edged tool covers 3A to 3C may be omitted by describing the edged tool cover 3. Note that in the edged tool cover 3, a blade side and a back side of a stored edged tool 4 may be respectively referred to as a blade side and a back side of the edged tool cover 3. Moreover, in the edged tool cover 3, the side close to a handle 41 of the blade of the stored edged tool 4 and the side far from the handle 41 may be respectively referred to as the root side and the distal end side of the edged tool cover 3.

Each of the edged tool covers 3, 3A, 3B, and 3C stores an edged tool. The edged tool cover 3 stores a kitchen knife (Chef's knife) as an edged tool. The edged tool cover 3A stores a fruit knife as an edged tool. The edged tool cover 3B stores a bread knife as an edged tool. The edged tool cover 3C stores kitchen scissors as an edged tool. The edged tool storage device may store other edged tools used in a kitchen than the edged tools exemplified here.

Figure 4:
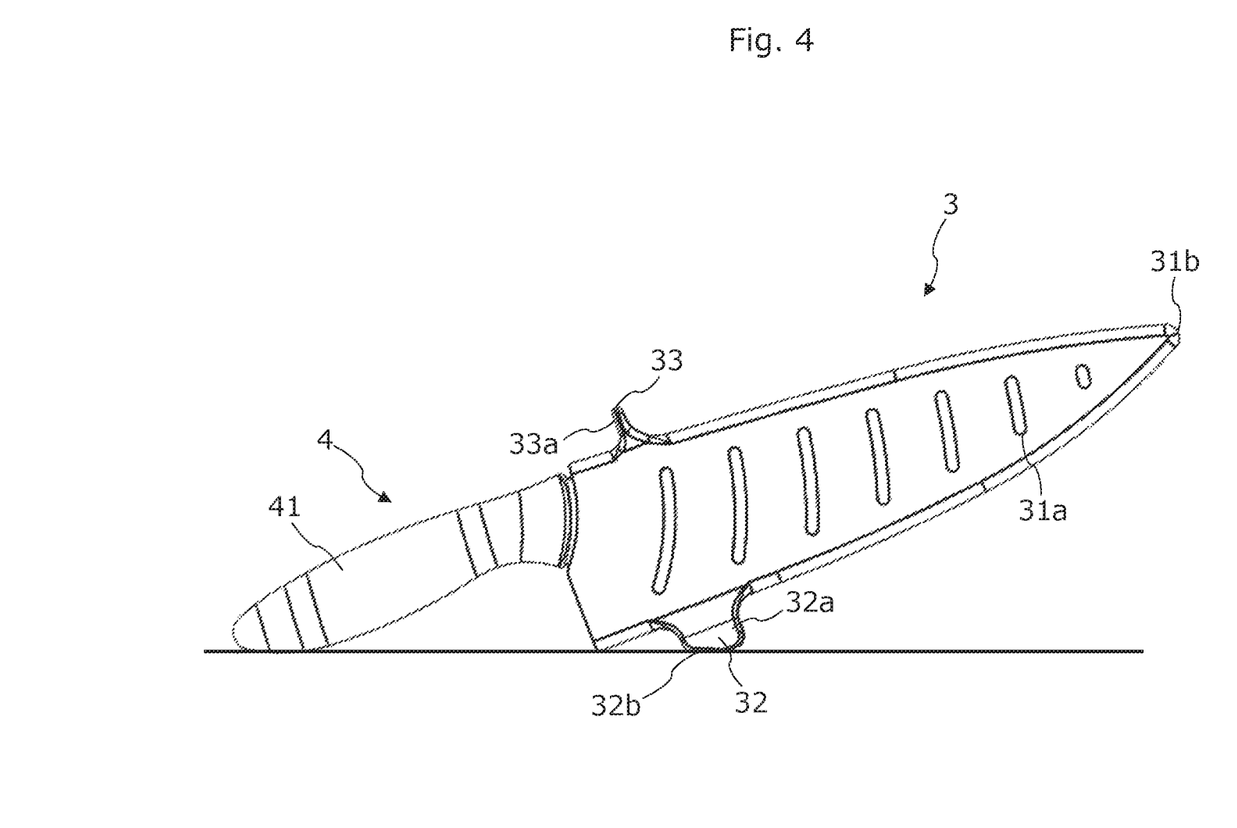
FIG. 4 is a diagram illustrating an edged tool cover and an edged tool in an erected state where the blade side is downward.
Figure 5:
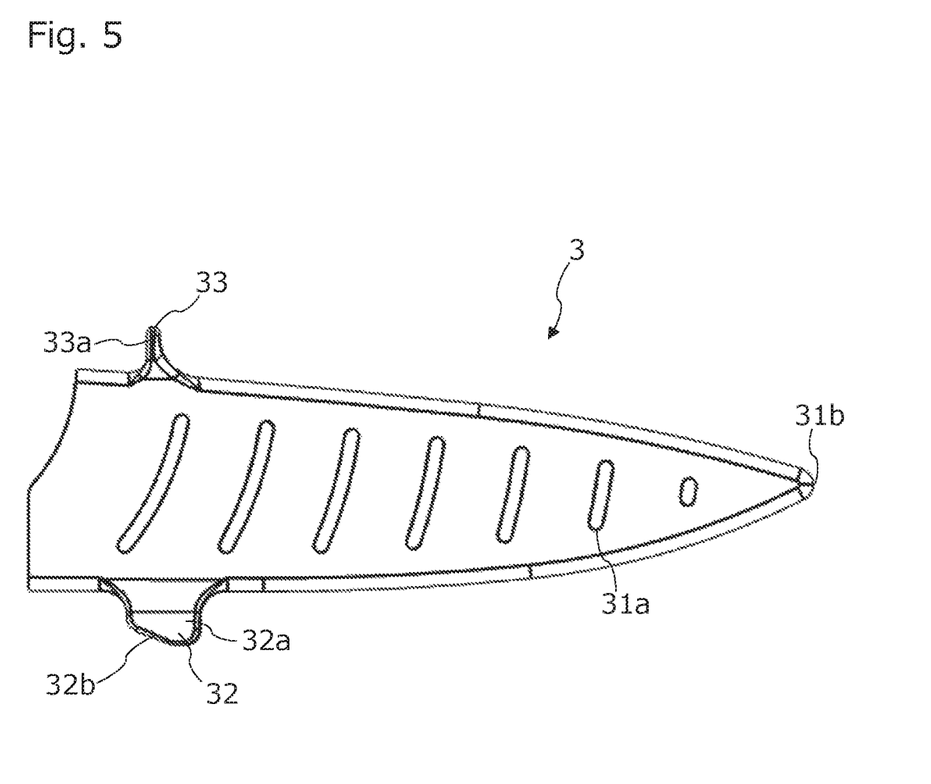
FIG. 5 is a side view of the edged tool cover.
Figure 6:
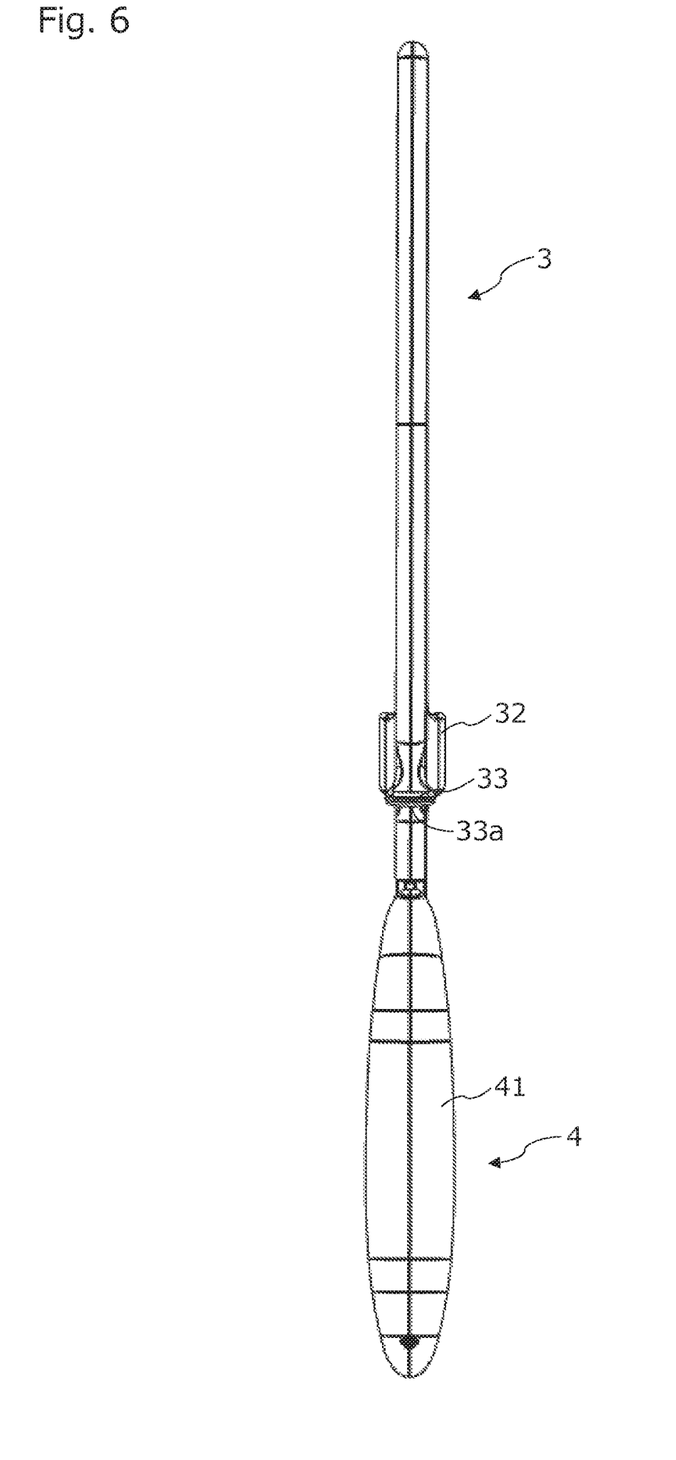
FIG. 6 is a view of the edged tool cover and the edged tool, viewed from a holding part side.
Figure 7:
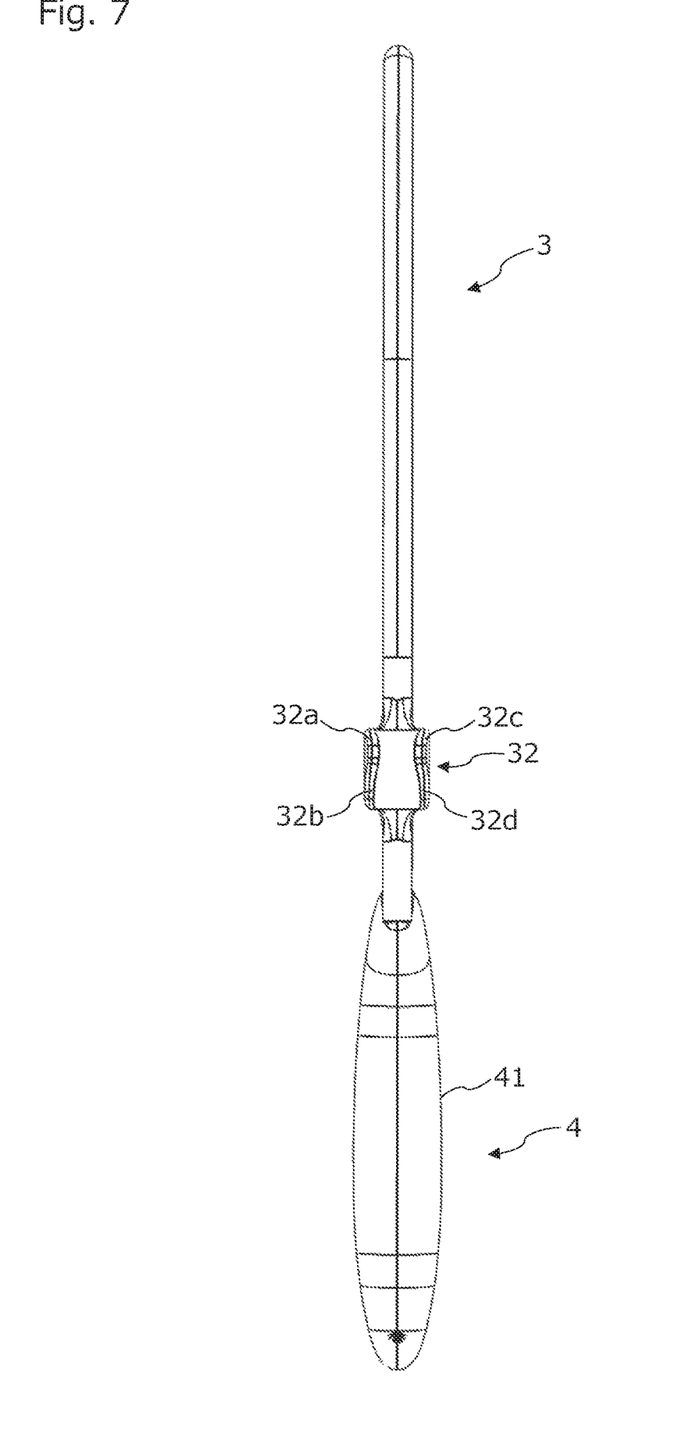
FIG. 7 is a diagram of the edged tool cover and the edged tool, viewed from a cover pressing part side.

FIG. 4 is a diagram illustrating the edged tool cover 3 and the edged tool 4 in an erected state where the blade side is downward. FIG. 5 is a side view of the edged tool cover 3. FIG. 6 is a diagram of the edged tool cover 3 and the edged tool 4, when viewed from the holding part 32 side. FIG. 7 is a diagram of the edged tool cover 3 and the edged tool 4, viewed from the cover pressing part 33 side that is the opposite side of the holding part 32.

The edged tool cover 3 is able to store the edged tool 4 so as to cover a blade of the edged tool 4. That is, in the state where the edged tool cover 3 stores the edged tool 4, the handle 41 of the edged tool 4 projects from the edged tool cover 3. The edged tool cover 3 has a plurality of through-holes 31*a* on the side surfaces. A distal end 31*b* of the edged tool cover 3 may be in contact with the pedestal 1 in the state where the edged tool cover 3 is connected to the support rod 2.

The holding part 32 is formed on the root side of the blade side of the edged tool cover 3. The holding part 32 includes holding pieces 32*a* and 32*c*. In the holding pieces 32*a* and 32*c*, the surfaces facing the support rod 2 when the edged tool cover 3 is connected to the support rod 2, have a circular arc shape with the center of the circle corresponding to the center of the support rod 2. Each of the holding pieces 32*a* and 32*c* has a center angle of 90° or larger. That is, the center angle of the circular arc portion of the holding part 32 is 180° or larger. The holding part 32 is made of rubber or resin having elasticity, and is elastically deformed and thus removably connected to the support rod 2. In this manner, the connection of the holding part 32 and the support rod 2 by elastic deformation of the holding part 32 and fitting thereof onto the support rod 2 is also referred to as snap-fit. Moreover, the center angle of the circular arc portion of the holding part 32 is 180° or larger, as described above. Thus, in the state where no force is applied, the edged tool cover 3 does not fall off from the support rod 2. Moreover, the holding part 32 is provided on the blade side of the edged tool cover 3, and thus the handle 41 of the edged tool 4 is positioned on the side separate from the support rod 2 in the state where the holding part 32 is connected to the support rod 2. This allows a user to easily grip the handle 41 of the edged tool 4. Furthermore, with the structure in which a distance from the support rod 2 gradually becomes larger from the distal end 31*b* of the edged tool cover 3 toward the handle 41, as in the embodiment, a user is able to grip the handle 41 more easily, which is more preferable.

The edged tool cover 3 with the edged tool 4 stored therein may be placed in the state where the blade side is downward, as illustrated in FIG. 4. In this state, the handle 41 of the edged tool 4 and the holding part 32 are fulcrums. To be more specific, in the state where the edged tool cover 3 is placed so that the holding part 32 is a fulcrum, a part of the holding part 32 in contact with a placement surface includes a surface contact parts 32*b* and 32*d* that are at least partially linearly in surface contact with the placement surface. That is, the linear surface contact part 32*b* is formed in a part of the holding piece 32*a*, and the linear surface contact part 32*d* is formed in a part of the holding piece 32*c*.

In the edged tool cover 3, the cover pressing part 33 is formed on the root side of the back side. The cover pressing part 33 is formed to project outward from the end on the root side of the back side. A pressing surface 33a of the cover pressing part 33 is formed to be substantially horizontal in the state where the edged tool cover 3 is connected to the support rod 2. That is, the pressing surface 33a is formed to allow a user to press the pressing surface 33a of the cover pressing part 33 with one hand and easily take out the edged tool 4 from the edged tool cover 3 with the other hand in the state where the edged tool cover 3 with the edged tool 4 stored therein is connected to the support rod 2.

2. Modification

Next, a modification of the embodiment of the invention will be described. The edged tool storage device of the above-described embodiment may adapt the following modification. Note that the modification explained in the following will be described as a concrete example without intending the invention to be interpreted restrictively.

The pedestal 1 may have a structure with a concentric groove at a position where the distal end 31b is in contact in the state where the edged tool cover 3 is connected to the support rod 2. It is preferable that such a groove is formed to correspond to each of the edged tool covers 3 to 3C. With such a structure, the edged tool storage device stably holds the edged tool cover 3 more easily. Moreover, concentric patterns are formed in the pedestal 1, which enables the structure excellent in appearance.

Moreover, the edged tool cover 3 is removed from the support rod 2 and laid so that the holding part 32 is in contact with a placement surface, not the root side but the distal end side of the edged tool cover 3 may be in contact with the placement surface. In such a case, in the edged tool cover 3 with the edged tool 4 stored therein, the holding part 32 and the position on the distal end side of the holding part 32 of the edged tool cover 3 are in contact with the placement surface. In such a state, the handle 41 is separate from the placement surface in a floating state, which allows the user to grip the handle 41 easily.

Moreover, the holding part 32 may be provided on the back side instead of the blade side of the edged tool cover 3. In this case, the cover pressing part 33 is provided on the blade side of the edged tool cover 3.

Moreover, the edged tool cover 3 may include an energizing part preventing falling of the stored edged tool 4 while energizing it at a position between the blade side and the back side of the root side. The energizing part is provided to elastically energize the edged tool 4.

Moreover, the number of edged tool storable in the edged tool storage device may be decided to an arbitrary number equal to or more than one. That is, although the embodiment has a structure with four edged tool covers, it may have a structure with five or more edged tool covers or a structure with one to three edged tool covers.

Moreover, the edged tool covers 3 to 3C may have mutually different colors. If the edged tool covers 3 to 3C have mutually different colors, the edged tool storage device may have a plurality of colors, thus enabling a structure excellent in appearance.

Moreover, the edged tool covers 3 to 3C may have design with unity such as creatures including animals or fishes of the same category, or vegetables. To be more specific, the edged tool covers may all have a shape of a koala, have a combination of shapes of a koala, a sloth, a panda, and a monkey, or have a combination of shapes of mutually different vegetables. Such a design enables a structure which is further excellent in appearance.

3. Characteristics of Invention

The invention described above using the exemplified embodiment and modifications has the following characteristics.

The edged tool storage device of the invention has a structure including the edged tool cover 3 that stores the edged tool 4 and is removably connected to the support rod 2, which is a structure having an appearance and a function that are not provided by the conventional edged tool holder. In this manner, it is possible to convert the edged tool storage device from a mere kitchen knife holder having a function of storing a kitchen knife into an interior accessory with a sense of playfulness, capable of storing edged tools.

Moreover, in the edged tool storage device of the invention, the edged tool cover 3 includes the holding part 32 that is elastically fitted onto the support rod 2 and is held by the support rod 2, and this holding part 32 allows the edged tool cover 3 to be attached to and removed from the support rod 2. In this manner, the edged tool storage device of the invention includes the edged tool cover 3 that is easily attached to and removed from the support rod 2 and allows a user to easily change a connection position to the support rod 2.

Moreover, the edged tool storage device of the invention includes a plurality of edged tool covers 3 to 3C, and each of the holding parts 32 of the edged tool covers 3 to 3C is different in height. Thus, it is possible to connect the edged tool covers 3 to 3C to the support rod 2 without interfering with each other.

Furthermore, in the edged tool storage device of the invention, the support rod 2 is columnar, and the edged tool covers 3 to 3C may be connected to arbitrary positions in a circumference direction of the support rod 2. Thus, the positions of the edged tool covers 3 to 3C may be rotated freely relative to the support rod 2, which further improves the appearance. In addition, it is possible to change a position of the edged tool in accordance with a use state thereof, which is excellent also in practicability.

Moreover, in the edged tool storage device of the invention, the holding part 32 includes the surface contact parts 32b and 32d in surface contact with a placement surface in a case where the edged tool cover 3 is placed so that the holding part 32 is a fulcrum. In this manner, the edged tool cover 3 removed from the support rod 2 may be placed in an erected state in the state where the blade side or the back side is downward.

Moreover, the edged tool storage device of the invention has a structure in which the edged tool cover 3 includes the cover pressing part 33 projecting outward at the position opposite from the holding part 32. This allows a user to easily take out the edged tool 4 stored in the edged tool cover 3.

4. Supplements

The embodiment and the modifications of the invention have been explained concretely. The above-described explanation is only explanation as one configuration example and one operation example, and the scope of the invention is not limited to these embodiment and modifications, and is to be interpreted widely within the range grasped by a person skilled in the art based on the same technical idea.

INDUSTRIAL APPLICABILITY

The edged tool storage device of the invention is preferably applied as an object storing a kitchen knife and the like.

REFERENCE SIGNS LIST 1 pedestal
2 support rod
3 to 3C edged tool cover
31*a* through-hole
31*b* distal end
32 holding part
32*a*, 32*c* holding piece
32*b*, 32*d* surface contact part
33 cover pressing part
33*a* cover pressing surface
4 edged tool
41 handle

What is claimed is:

1. An edged tool storage device, comprising:
a pedestal;
a support rod that extends in a substantially vertical direction from the pedestal; and
a first edged tool cover and a second edged tool cover that are removably connected to the support rod and store edged tools, wherein
each of the first edged tool cover and the second edged tool cover includes a holding part that is elastically fitted onto the support rod such that each said edged tool cover is removably connected to the support rod by the holding part,
the holding part of the first edged tool cover and the holding part of the second edged tool cover are different in height when connected to the support rod, and
the holding part includes a surface contact part that is in surface contact with a placement surface when the edged tool cover is placed so that the holding part is a fulcrum.

2. The edged tool storage device according to claim 1, wherein
each of the first edged tool cover and the second edged tool cover covers substantially entire blade of the edged tool to be stored.

3. The edged tool storage device according to claim 1, wherein the holding part is provided on the side of each of the first edged tool cover and the second edged tool cover corresponding to a blade side of a respective edged tool.

4. The edged tool storage device according to claim 1, wherein the support rod is columnar, and each of the first edged tool cover and the second any b edged tool cover is connected to any position in a circumferential direction of the support rod.

5. The edged tool storage device according to claim 1, wherein
each of the first edged tool cover and the second edged tool cover includes a cover pressing part that projects outward and opposite from the holding part.

* * * * *